3,536,518
METHOD OF APPLYING PRINT PATTERN OF RESIN TO FIBROUS SHEET MATERIAL

Arthur Herbert Drelich, Plainfield, N.J., assignor to Johnson & Johnson, a corporation of New Jersey
No Drawing. Filed Mar. 10, 1967, Ser. No. 623,797
Int. Cl. B44d *1/092, 1/44*
U.S. Cl. 117—38                                                            8 Claims

ABSTRACT OF THE DISCLOSURE

Application to a fibrous material of an aqueous resin binder dispersion, which is stable at a pH of from about 7 to about 9 and which is dispersed and stabilized by an anionic surfactant which is active at a pH of from about 7 to about 9 but which is inactivated by the presence of free divalent or trivalent metal cations which are released at pH less than about 7 by a metal chelate having a divalent or trivalent cation, and substantially simultaneously lowering the pH of the binder dispersion to less than 7 to precipitate the resin binder onto the material is taught. The substrate may be pretreated with acid to cause precipitation of the resin binder.

---

This invention relates to resin compositions useful in depositing the resin on other materials in a controlled manner and to a method for controlling the deposition of a resin on other materials while the material is at acid conditions.

Emulsion polymerized resins are widely used throughout many industries. They have found use in the coating industries for the coating of woven fabrics, paper and other materials. The resins are also used as adhesives for laminating materials or for bonding fibrous webs. These resins have also found wide use as additives in the manufacture of paper, the printing industry and other industries.

In most instances the resin is dispersed in water and when applied from the aqueous solution is carried by the water until the water is driven off. If it is desired to place the resin on the surface of porous or absorbent sheet material, the material tends to absorb the water and carry the resin into the material rather than depositing the resin merely on the surface. If such resins are used in bonding nonwoven fabrics, especially in pattern bonding, the water tends to wick along the fibers and carry the resin with it. Although placed in a specific pattern, the pattern will spread due to the diffusion of the water and resin until the water is driven off.

I have now discovered a resin composition and the manner for applying such resin composition to other materials so that the resin may be deposited in a controlled manner. If it is desired that the resin only be placed on the surface of a material my composition and method will allow this to be done. Furthermore, if it is desired that the resin be impregnated throughout the material, again, my composition and method will allow this to be done.

Many papers today are made with resin additives to give the paper various qualities and properties. A major problem in the formation of such papers is the uniformity of the paper. By utilizing my resin compositions in the formation of such papers, highly uniform papers may be produced. By adding my resin compositions to the fiber slurries as the papers are being formed, I can control the deposition of the resin on the paper fibers.

Emulsion polymerized resins are also used in the printing industry and the utilization of my resin compositions in accordance with my method improves the clarity of the print and allows control of the printing process.

The resins which may be used in accordance with the present invention are the emulsion polymerized resins which are stable under slightly alkaline conditions, i.e. pH's of 7 to 9. These resins may also be stable under acid conditions, i.e. pH's below 7. These resins are produced by emulsifying the monomers, stabilizing the emulsion with an anionic surfactant system and polymerizing the monomers in the emulsified state to form a solid resin polymer. The solid polymer is usually dispersed in an aqueous medium as discrete particles of colloidal dimensions (1 to 2 microns or smaller) and is generally termed "resin emulsion" or "latex."

In accordance with the present invention I have discovered a new composition of a stable emulsion polymerized resin dispersion having a pH of from about 7 to 9 and an anionic surfactant selected from the class consisting of alkyl aromatic sulfonic acids, alkane sulfonic acid and carboxylic acids. The dispersion comprises from about 0.1% to 75% by weight of emulsion polymerized resin solids, from about 0.1% to 5% by weight of the resin solids of an anionic surfactant selected from the class consisting of alkyl aromatic sulfonic acids, alkane sulfonic acids and carboxylic acids and from about 0.01% to 2% by weight of the resin solids of a metal chelate compound.

I have further discovered that if the resin composition described is utilized in applying resins to other materials, the deposition of the resin may be controlled by applying the resin dispersion to the other material while substantially simultaneously lowering the pH of the dispersion to a value less than 7. For example, if it is desired to apply the resin merely to the surface of the other material, the pH of the other material is lowered to less than 7 and the dispersion, in accordance with the present invention, applied to the material. The resin will be deposited substantially only on the surface of the material. On the other hand, if the other material is given a pH of greater than 7 and the resin applied and then the other material substantially immediately treated to lower its pH to less than 7, the resin will be deposited throughout the other material. Other variations will, of course, be readily apparent to one skilled in the art.

It is believed that the anionic surfactant in the resin dispersion system maintains the colloidal dispersion of solid particles in a stable dispersed form. When a strong cation such as is present in a chelate compound is introduced in the resin dispersion and the resin dispersion made acid forming the cation, the cation destroys the surfactant system precipitating the resin particles and allowing for control of the deposition of the resin on other substances. This, of course, is only one suspected theory as to why my new composition allows for controlled resin deposition.

The metal chelate compounds suitable for use with the present invention are compounds in which atoms of the same molecule are coordinated with a metal ion. Suitable metals in the chelate compound are calcium, magnesium, iron, zinc, copper, tin, etc. Suitable chelate compounds are the metal chelates of ethylenediaminetetraacetic acid, the metal chelates of salicylaldehyde imine, the metal chelates of condensed phosphates, the metal chelates of ammonium triacetic acid, etc.

The amount of metal chelate compound used will vary in accordance with the resin used and with the degree of control of the resin deposition that is desired. From about .01% to 2% or even higher by weight of the amount of resin solids present of the metal chelate compound may be used in accordance with the present invention. It is uneconomical to use the higher amounts of chelates especially in view of the relative cost of some of the chelates compared to the resin and hence, it is preferred to keep the upper limit at 2% or less.

The resins which may be used in the method of the present invention are the emulsion polymerized resins which are in the form of solid resin particles dispersed in a liquid which is usually water. These resin dispersions or resin emulsions as they are called, are stabilized by the anionic surfactant system and the dispersion is stable at pH's of 7 to 9. Suitable examples would be the polyvinyl chlorides, polyvinyl acetates, polyacrylic resins, synthetic rubber latexes, etc.

Generally, the particles size in the resin dispersions will vary from about 1/10 of a micron or smaller to 3 to 5 microns in size. And the amount of resin solids in the dispersion will vary from 1/10 of a percent solids up to 75% or even higher solids, generally dependent upon the resin used, the surfactant system and the conditions under which the polymerization was carried out.

The surfactant system used must be anionic and the anionic surfactant must be capable of precipitation by a cation. Suitable anionic surfactants are the alkyl aromatic sulfonic acids, alkane sulfonic acids and the carboxylic acids, such as dodecyl benzene sulfonate, cetane sulfonic acid and the fatty acid soaps. The amount of surfactant used may vary from about 0.1% to 5% by weight of the resin solids dependent on the type resin being polymerized and the conditions under which it is polymerized.

The resin dispersion containing the metal chelate compound is stable as long as the pH is from about 7 to 9, however, once the pH is lowered below about 7, it appears that the metal cation is released and attacks the anionic surfactant system in the resin dispersion causing the resin particles to agglomerate or coagulate. If the surface of a fibrous web contains a dilute acid and the composition of resin and metal chelate compound as previously described is placed on the web, the particles will immediately coagulate on the surface of the fibers.

The pH may be lowered by any of the known dilute acids such as acetic acid, or any other material which will give a pH of less than 7. The dilute acid and amount of acid used is controlled by economics and by the effect the acid may have on the other material. It will be readily apparent to one skilled in the art that suitable acids and concentrations may be chosen dependent on the material to be treated.

The invention will be further illustrated in greater detail by the following specific example. It should be understood, however, that although this example may describe in particular detail some of the more specific features of the invention, it is given primarily for purposes of illustration and the invention in its broader aspects is not to be construed as limited thereto

EXAMPLE

Approximately 7 grams of the di-calcium salt of ethylenediaminetetraacetic acid is directly added with stirring to approximately 1400 grams of a polyvinyl acetate emulsion of about 55% solids. The emulsion contains approximately 720 grams of vinyl acetate polymer stabilized with about 35 grams of dodecyl benzene sulfonate with the remainder water. Sufficient ammonia is added to the emulsion to bring the pH to 8.

A fibrous web of 100% rayon fibers, 1½ denier and 1½ inch in length is impregnated with a 0.5% aqueous solution of acetic acid. The above described resin emulsion is printed on the treated web in a pattern of four horizontal wavy lines per inch. At the moment of printing, the alkaline resin emulsion meets the acid web, liberating calcium ions and destroying the effectiveness of the anionic surfactant (dodecyl benzene sulfonate). The resin particles are immediately precipitated and not allowed to migrate.

Having now described the invention in specific detail and exemplified the manner in which it may be carried into practice, it will be readily apparent to those skilled in the art that innumerable variations, applications, modifications, and extensions of the basic principles involved may be made without departing from its spirit and scope.

What is claimed is:

1. A method of applying an aqueous resin binder dispersion in a specific print pattern of intermittently spaced binder areas to a porous, absorbent fibrous sheet material and controlling the spread or migration of said aqueous resin binder dispersion on said porous, absorbent fibrous sheet material which comprises: preparing an aqueous resin binder dispersion containing from about 0.1% to about 75% by weight of emulsion polymerized resin solids, from about 0.1% to about 5% by weight of the resin solids of an anionic surfactant capable of precipitation by a free divalent or trivalent metal cation under acid conditions and selected from the class consisting of alkyl aromatic sulfonic acids, alkane sulfonic acids and carboxylic acids, and from about 0.01% to about 2% by weight of the resin solids of a metal chelate compound having a divalent or trivalent metal cation capable of destroying the anionic surfactant system under acid conditions, said aqueous resin binder dispersion having a pH of from about 7 to about 9 at which it is stable but being dispersed and stabilized by an anionic surfactant which is inactivated by the presence of free divalent or trivalent metal cations at a pH less than about 7; applying said aqueous resin binder dispersion in a specific print pattern of intermittently spaced binder areas to a porous, absorbent fibrous sheet material; and substantially simultaneously lowering the pH of the aqueous resin binder dispersion to less than 7, whereby the resin binder solids immediately coagulate and precipitate on said material in the form of the specific print pattern of intermittently spaced binder areas with a minimum of migration.

2. The process according to claim 1, wherein, the chelate compound is a metal salt of ethylenediaminetetraacetic acid.

3. The process according to claim 1, wherein, the chelate compound is di-calcium ethylenediaminetetraacetic acid.

4. The process according to claim 1, wherein, the pH of the dispersion is lowered to less than 7 with acetic acid.

5. A method of applying an aqueous resin binder dispersion in a specific print pattern of intermittently spaced binder areas to a porous, absorbent fibrous sheet material and controlling the spread or migration of said aqueous resin binder dispersion on said porous, absorbent fibrous sheet material which comprises: preparing an aqueous resin binder dispersion containing from about 0.1% to about 75% by weight of emulsion polymerized resin solids, from about 0.1% to about 5% by weight of the resin solids of an anionic surfactant capable of precipitation by a free divalent or trivalent metal cation under acid conditions and selected from the class consisting of alkyl aromatic sulfonic acids, alkane sulfonic acids and carboxylic acids, and from about 0.01% to about 2% by weight of the resin solids of a metal chelate compound having a divalent or trivalent metal cation capable of destroying the anionic surfactant system under acid conditions; said aqueous resin binder dispersion having a pH of from about 7 to about 9 at which it is stable but being dispersed and stabilized by a surfactant which is inactivated by the presence of free divalent or trivalent metal cations at a pH less than about 7; treating a porous, absorbent fibrous sheet material with an acidic material to lower the pH of the porous, absorbent fibrous sheet material to less than 7; applying said aqueous resin binder dispersion in a specific print pattern of intermittently spaced binder areas to the acidified, porous absorbent fibrous sheet material; and substantially simultaneously lowering the pH of the aqueous resin binder dispersion to less than 7, whereby the resin binder solids immediately coagulate and precipitate on said material in the form of the specific print pattern of intermittently spaced binder areas with a minimum of migration.

6. The method according to claim 5 wherein the chelate compound is a metal salt of ethylenediaminetetraacetic acid.

7. The method according to claim 5 wherein the chelate compound is di-calcium ethylenediaminetetraacetic acid.

8. The method according to claim 5 wherein the pH of the resin binder dispersion is lowered to less than 7 by acetic acid.

References Cited

UNITED STATES PATENTS

| | | | |
|---|---|---|---|
| 2,087,237 | 7/1937 | Bolton | 117—62.2 X |
| 2,571,075 | 10/1951 | Tomanuk | 117—155 |
| 2,724,707 | 11/1955 | Brown | 117—161 X |
| 2,880,189 | 3/1959 | Miller et al. | 117—161 X |
| 3,083,118 | 3/1963 | Briogeford | 117—38 X |
| 3,010,929 | 11/1961 | Jones | 117—161 X |
| 3,085,076 | 10/1959 | Zimmerman | 117—161 X |
| 3,134,687 | 5/1964 | Luck | 117—161 X |
| 3,288,741 | 11/1966 | Cheng | 117—161 X |
| 3,364,165 | 1/1968 | Zimmerman | 117—161 X |

OTHER REFERENCES

| | | |
|---|---|---|
| 735,234 | 8/1955 | Great Britain. |
| 1,341,872 | 9/1963 | France. |

WILLIAM D. MARTIN, Primary Examiner

M. R. P. PERRONE, Jr., Assistant Examiner

U.S. Cl. X.R.

117—56, 60, 62.1, 140, 155, 161